(12) United States Patent
Mashburn

(10) Patent No.: US 7,729,880 B1
(45) Date of Patent: Jun. 1, 2010

(54) WIRELESS VEHICLE SERVICE SYSTEMS USING ADDRESSABLE DEVICES

(75) Inventor: James F. Mashburn, Conway, AR (US)

(73) Assignee: SNAP-On Incorporated, Pleasant Prairie, WI (US)

( * ) Notice: Subject to any disclaimer, the term of this patent is extended or adjusted under 35 U.S.C. 154(b) by 1774 days.

(21) Appl. No.: 10/805,287

(22) Filed: Mar. 22, 2004

(51) Int. Cl.
*G01C 9/00* (2006.01)

(52) U.S. Cl. ....................................... 702/151

(58) Field of Classification Search ........... 702/151, 702/188
See application file for complete search history.

(56) References Cited

U.S. PATENT DOCUMENTS

| | | | |
|---|---|---|---|
| 4,761,749 A | 8/1988 | Titsworth et al. | |
| 5,592,383 A | 1/1997 | Rogers et al. | |
| 6,362,730 B2 | 3/2002 | Razavi et al. | |
| 6,754,562 B2 * | 6/2004 | Strege et al. | 700/279 |

* cited by examiner

*Primary Examiner*—Drew A Dunn
*Assistant Examiner*—Stephen J Cherry
(74) *Attorney, Agent, or Firm*—McDermott Will & Emery LLP

(57) ABSTRACT

A wireless vehicle service system using addressable devices to avoid interference from similar devices within communications distance. The system includes a host and a plurality of devices that communicate with the host wirelessly. Each of the devices has a unique address, and stores information describing the device, such as the type of the device, a system to which the device is associated, a location of the device, etc. During an enumeration process, each device sends signals including its address and the information describing that device to a host of the vehicle service system. The host stores relationships between the addresses and associated information. For signals sent by the devices and received by the host, the host decodes an embedded address from the signals, and obtains information related to the device sending the signals based on the decoded address and the stored information associated to the decoded address. The host then processes the received signals by referring to the information describing the device sending the signals.

15 Claims, 8 Drawing Sheets

400

| ADDRESS 1 | WHEEL A | SYSTEM 1 | . . . . . |
|---|---|---|---|
| ADDRESS 2 | WHEEL B | SYSTEM 2 | . . . . . |
| ⋮ | ⋮ | ⋮ | ⋮ |
| ADDRESS N | WHEEL X | SYSTEM N | . . . . . |

FIG. 6

WIRELESS VEHICLE SERVICE SYSTEMS USING ADDRESSABLE DEVICES

FIELD OF DISCLOSURE

This disclosure generally relates to vehicle service systems utilizing wireless data transmission, and more specifically, to creation and use of a unique address to identify and communicate with a device of a vehicle service system to avoid interference by other wireless devices.

BACKGROUND OF THE DISCLOSURE

Wireless communications are widely used in various kinds of devices and/or systems for transmitting data. For example, a wireless alignment system provides alignment sensors with wireless transceivers for attaching to or contacting with vehicle wheels or vehicle body to obtain data related to alignment parameters thereof, such as toe angles, camber, caster, vehicle body centerline, wheelbase, etc. The data obtained by the sensors are transmitted by the transceiver associated with each sensor to a host for further processing. Examples of wireless alignment systems are discussed in U.S. Pat. No. 5,592,383, titled "WHEEL ALIGNER CORDLESS COMMUNICATIONS UNIT," and U.S. Pat. No. 4,761,749, titled "VEHICLE WHEEL ALIGNMENT APPARATUS AND METHOD." Both of the above-referenced patents are commonly assigned to the assignee of this application, and incorporated herein by reference in their entireties.

However, wireless communications between the host and sensors usually are susceptible to interference by signals sent to and from other hosts and/or sensors of the same type. Conventional wireless systems avoid interferences from other sensors and/or hosts by allocating different channels for each sensor using different frequency bands or hopping sequences. However, available frequency bands are limited. As the number of sensors increase, the number of sensors will exceed available channels.

Furthermore, wireless alignment sensors may be used with different vehicle wheels or parts. In other words, the sensors are swappable. For example, an alignment sensor may be used to measure parameters of the right front wheel of vehicle A in a first alignment service, but may be used to measure parameters of the left right wheel of vehicle B in a second alignment service. Thus, in order for a host to correctly calculate alignment parameters, the host needs to identify which wheel of the vehicle that the received signals are associated to.

In addition, in a vehicle service center, there are usually a plurality of alignment systems servicing numerous vehicles at the same time, which involves a large number of alignment sensors communicating with the same host or different hosts. As all the hosts and/or alignment sensors are located within effective communication distances, signals sent by alignment sensors of one alignment system can be received by a host of another alignment system in the service center, which will cause errors if the host calculates alignment parameters of a vehicle under service using positional parameters from other vehicles. Thus, the host also needs to identify whether a received signal indeed come from an alignment sensor of a specific alignment system.

SUMMARY OF THE DISCLOSURE

This disclosure presents a wireless vehicle service system using addressable devices that provides numerous advantages that will be appreciated and understood from the following descriptions.

An exemplary method for wireless communications method between a device and a host of a vehicle service system identifies the device with a unique address associated with that device. The device sends signals including the address unique to that device and information describing the device to the host, such that the host can discriminate signals received from one device from another. The information describing the device may include the type of device (alignment sensor, battery sensor, emission sensor, etc), the function of the device (obtaining voltages, obtaining angles, obtaining data from on-board vehicle computers, etc.), the location of the device (right front wheel, headlight, brakes, engine, etc.), a vehicle part to which the device is associated (batteries, alternator, tailpipe, wheels, etc.), and/or a service system to which the device belongs (wheel alignment systems, body alignment systems, battery service systems, emission test systems, engine analysis systems, etc.), and so on. The information describing the device may be entered by a user, preset during manufacture of the device, and/or determined by the device automatically.

In one aspect, the address of a device is preset during manufacture of the device. In another aspect, the address is generated based on the information describing the device, such as by encoding the information describing the device into a unique address, so that the address of a device includes embedded information describing the device. For instance, a unique address for a measurement sensor for use in an alignment service is created by obtaining information related to a wheel for which the sensor is taking measurements, and incorporating such information into the address.

According to one embodiment, a host obtains addresses of devices within its communications distance by broadcasting a request to solicit identifications of the devices. In response to the request, each device sends signals including their respective address and information describing the respective devices to the host. As discussed earlier, the information describing the device may be embedded in the address, or be separated from the address identifying the device. The host decodes the information decodes the address and information describing the device from the received signals, and stores the address and the associated information in a data storage device, such as volatile or non-volatile memory devices. For example, the host may create a look-up table or identification algorithm by linking the addresses of the devices and their respective information describing the devices. In one aspect, the host sends the request periodically in order to obtain updated information and/or addresses of the devices. According to another embodiment, whenever a sensor's information/address is changed, the sensor may send a signal to the host to request update of data related to that device.

In order to initiate communication with a specific device, say an alignment device used in an alignment system for measuring parameters of the right front wheel of a vehicle, the host accesses the data storage device to obtain the address that corresponds to an alignment sensor used for obtaining parameters of the right front wheel by using the look-up table, and sends a communication request embedding the address. In response to this request, devices correspond to the unique address embedded in the request would respond to the host.

For a device to initiate communications with the host, the device sends out signals with its unique address embedded. The signals, once received by the host, are decoded to determine the embedded address. Based on the decoded address, the host may access additional information associated with the device sending the signals by accessing the look-up table or identification algorithm to determine what the kind of device it is. As the host is able to determine the device communicating with the host, the host may process signals sent by that device properly. For example, the host may use an alignment algorithm, not a battery diagnostic algorithm, to calculate the toe angle of a vehicle wheel based on the signals sent by an alignment sensor.

An exemplary wireless device for generating a unique address as discussed previously includes a sensing module for generating signals related to measurements of a vehicle part. The device further includes a signal port for receiving signals from the sensing module, a controller for processing data, a transceiver for transmitting and receiving signals wirelessly, and a data storage device for storing an address unique to the device, information describing the device, and signals received from the sensing module related to the measurements of the vehicle part. As previously described, the information describing the device may be entered by a user, preset during manufacture of the device, and/or determined by the device automatically. The address may be preset during manufacture of the device, input by a user, and/or generated by the device, etc. The address may be generated by the controller by accessing the data storage device for the information describing the device. The device then generates an address unique to the device by incorporating the information describing the device into the address. According to another embodiment, the controller generates the address by combining a preset ID with the information related to the device. The address is then transmitted by the transceiver. In one embodiment, the controller causes signals including the address and information describing the device sent to the host by the transceiver. In another embodiment, the controller further causes the signals related to the measurements transmitted by the transceiver.

An exemplary host for communicating an addressable device includes a controller for processing data, a transceiver for transmitting and receiving signals wirelessly, and a data storage device for storing data. The controller generates, and causes the transceiver to send, a request to solicit identifications of the devices. The controller decodes signals received by the transceiver from each of the plurality of measurement in response to the request. The signals include an address identifying the device sending the signals and/or information describing the device. The controller decodes the address and information related to the device from the received signals, and stores the relationships between the addresses and information describing the respective devices corresponding to the respective addresses.

In communicating with a device with a unique address, the controller of the exemplary host system generates, and causes the transceiver to send, a communication request embedding the unique address. In response, the device corresponding to the unique address sends signals to the host system.

For identifying which device sends signals to the host system, the controller of the exemplary host system decodes an address from the received signals, and accesses the data storage device for information describing the device sending the address, such as a vehicle part to which the device sending the decoded address is associated, and/or a service system to which the device belongs, based on the decoded address. Alternatively, such information may already be embedded in the address. In that case, the controller may obtain the information by decoding the received address. The controller may conduct a calculation related to the vehicle under service based on the received signals.

Still other advantages of the presently disclosed methods and systems will become readily apparent from the following detailed description, simply by way of illustration of the invention and not limitation. As will be realized, examples illustrated herein are capable of other and different embodiments, and their several details are capable of modifications in various obvious respects, all without departing from the disclosure. Accordingly, the drawing and description are to be regarded as illustrative in nature, and not as restrictive.

BRIEF DESCRIPTIONS OF THE DRAWINGS

The accompanying drawings, which are incorporated in and constitute a part of the specification, illustrate exemplary embodiments.

FIG. 6 shows exemplary data structures used by a host console when storing addresses and information related to sensors.

DETAILED DESCRIPTIONS OF ILLUSTRATIVE EMBODIMENTS

In the following description, for the purposes of explanation, numerous specific details are set forth in order to provide a thorough understanding of the present disclosure. It will be apparent, however, to one skilled in the art that the present method and system may be practiced without these specific details. In other instances, well-known structures and devices are shown in block diagram form in order to avoid unnecessarily obscuring the present disclosure.

SYSTEM OVERVIEW

For illustration purpose, the following example describes the operation of an exemplary vehicle service system for evaluating a wheel alignment status of a vehicle, using addressable alignment sensors. It is understood that the use of addressable devices is not limited to wheel alignment systems. The addressable devices also can be used in other types of vehicle service systems, such as vehicle body alignment systems for determining collision damages, battery service systems, emission test systems, etc., and/or combinations of various types of services systems, as well as other systems that have uses other than vehicle services that involve the use of a plurality of wireless devices to communicate with one or more host consoles.

Figure 1:
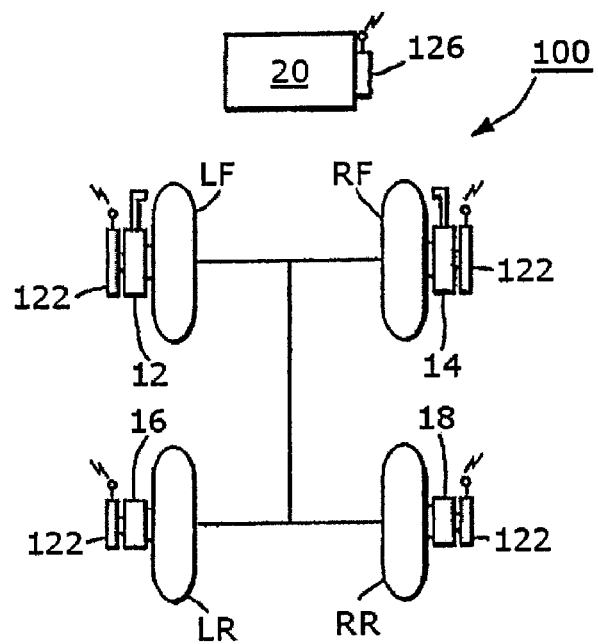
FIG. 1 is a schematic block diagram depicting architecture of an exemplary wireless alignment system using addressable sensors.

In FIG. 1, an exemplary wireless alignment system 100 using addressable alignment sensors is shown. The alignment system 100 includes four alignment sensors 12, 14, 16 and 18, which are removably mounted to the left and right front wheels LF, RF, and left and right rear wheels LR, RR of a vehicle. The alignment sensors 12, 14, 16 and 18 include angle determining devices for generating signals representative of angular orientations of the wheels. A variety of angle determining devices are well known in the art. Alignment system 100 also comprises a host console 20, which typically includes a computer processor and a video display. The processor controls the data gathering operation through appropriate instructions transmitted to the alignment sensors, processes the data generated by the sensors and displays alignment information for the vehicle on the video display.

Each of the alignment sensors 12, 14, 16 and 18 includes a wireless communications unit 122 for forming signal communications with the angle determining device of each alignment sensor. The host console 20 also includes a wireless communications unit 126. Each of the communications units 122 and 126 comprises a transceiver for communicating with similar transceivers. Data generated by the angle determining devices in the alignment sensors is transmitted via the respective transceivers of the alignment sensors, to the wireless communications unit 126 of the host console 20. Similarly, instructions from the processor of the host console 20 are transmitted via the wireless communications unit 126 to the respective wireless communications units 122 of the alignment sensor 12, 14, 16 and 18.

Figure 2:
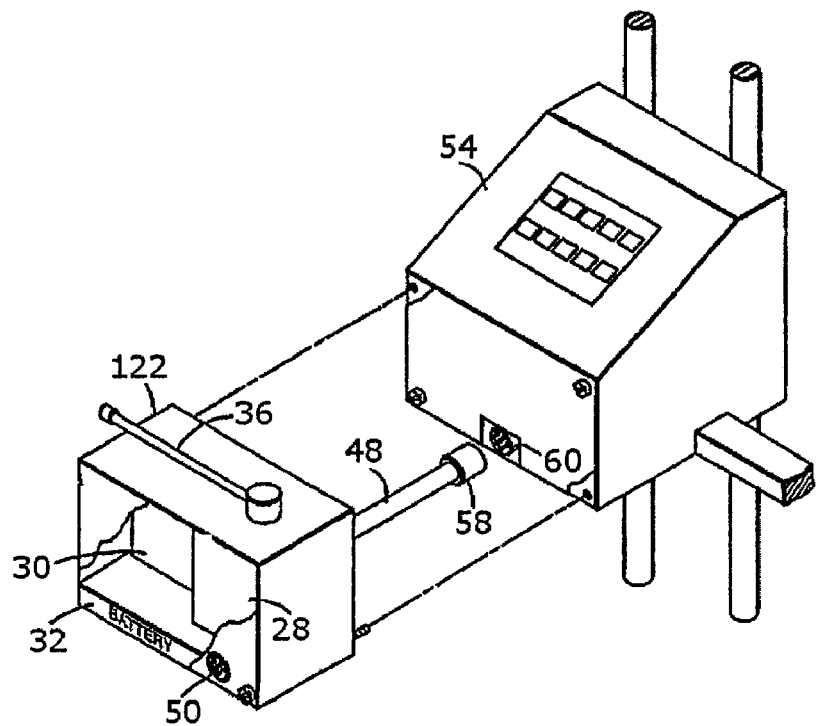
FIG. 2 shows an exemplary wireless measurement sensor for use in the wireless alignment system as shown in FIG. 1.

FIG. 2 shows an exemplary alignment sensor for use in the wireless alignment system 100 illustrated in FIG. 1. The alignment sensor includes an angle determining device 54 and a wireless communications unit 122. The wireless communications unit 122 includes a transceiver 28, a circuit board 30, and a power supply 32 mounted within a housing. The transceiver may be compatible with one or more wireless communication standards, such as Bluetooth, 802.11b, 802.11g, etc. or other proprietary standards. The transceiver 28 may operate at one or multiple frequencies, such as a 2.4 GHz. The transceiver 28 may be capable of communicating using spread spectrum technologies. The wireless communications unit 122 may also include an antenna 36 extending from the top of housing to provide for effective communication. The transceiver 28 provides an effective means for transmitting data from an alignment sensor to the transceiver located in the host console 20, and for receiving data transmitted by the transceiver located in the host console 20. The wireless communications unit 126 of the host console 20 has similar structure to those of wireless communications unit 122.

The power supply 32 can be any appropriate portable power supply, such as batteries. Power supply 32 is coupled to transceiver 28 and circuit board 30 to provide energy for operation. A connector 50 allows connection to a recharging cable for recharging.

The wireless communications unit 34 is removably connected to angle determining device 54 by any appropriate means, such as fasteners, straps, screws, etc. Alternatively, the wireless communications unit 34 can be integrated into the angle determining device 54. Wireless communications unit 122 forms signal communication with angle determining device 54 by, for example, using RS-232 bus 48, which is a cable having a standard plug 58 connected to its distal end. Plug 58 fits into the standard connector 60 of angle determining device 54 previously used for the cable connecting the console with the head.

In one aspect, the wireless communications unit 122 is not dedicated to a specific angle measuring device. Rather, the wireless communications unit 122 can be used with different angle measuring device and/or devices other than alignment sensors, for transmitting and/or receiving data wirelessly.

Figure 3:
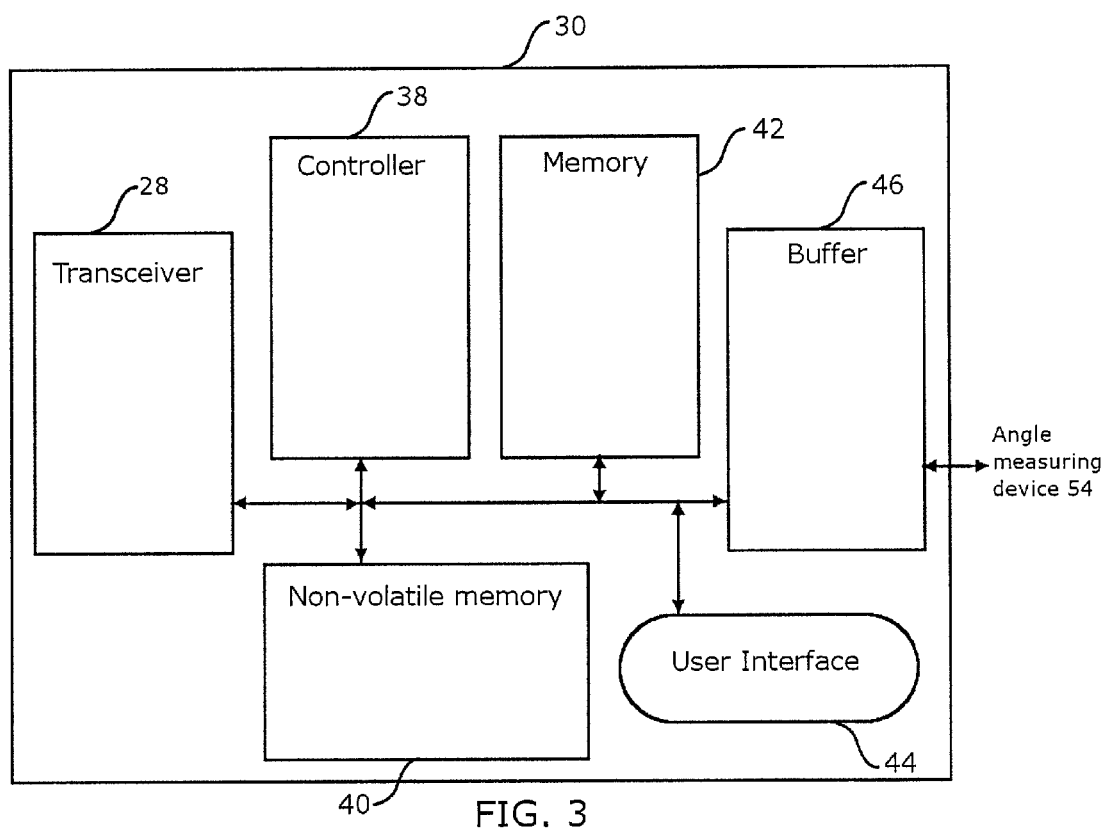
FIG. 3 depicts an exemplary circuit board with a transceiver installed thereon for use in the alignment sensor as shown in FIG. 2

FIG. 3 depicts an exemplary circuit board 30 with transceiver 28 installed thereon for use in the alignment sensor as shown in FIG. 2. Circuit board 30 includes a controller 38, such as a microcontroller or microprocessor; a non-volatile memory 40, such as a programmable read only memory ("PROM"), a volatile memory 42, such as DRAM, a buffer memory 46, and a user interface 44 for receiving user inputs, such as a key pad, touch screen, control buttons, microphones for voice recognition, etc., and/or combinations thereof.

The non-volatile memory 40 stores instructions that, upon execution of controller 38, control the controller 38 to perform functions as specified in the instructions. The non-volatile memory 40 also stores data related to the wireless communications unit 122 and/or the alignment sensor with which the circuit board 30 is associated.

Circuit board 30 includes a signal port (not shown) for receiving data transmitted by angle measuring device 54. The received data, after temporarily stored in buffer 46, is stored in memory 42 under the control of controller 38. Controller 38 may send data and/or commands to angle measuring device 54 via the signal port. For data received from transceiver 28, controller 38 decodes and checks the data for integrity. Circuit board 30 also comprises associated oscillators, logic, connectors and support circuitry, which elements are not depicted in FIG. 3 but are known to those of skill in the art to which this invention pertains.

Figure 4:
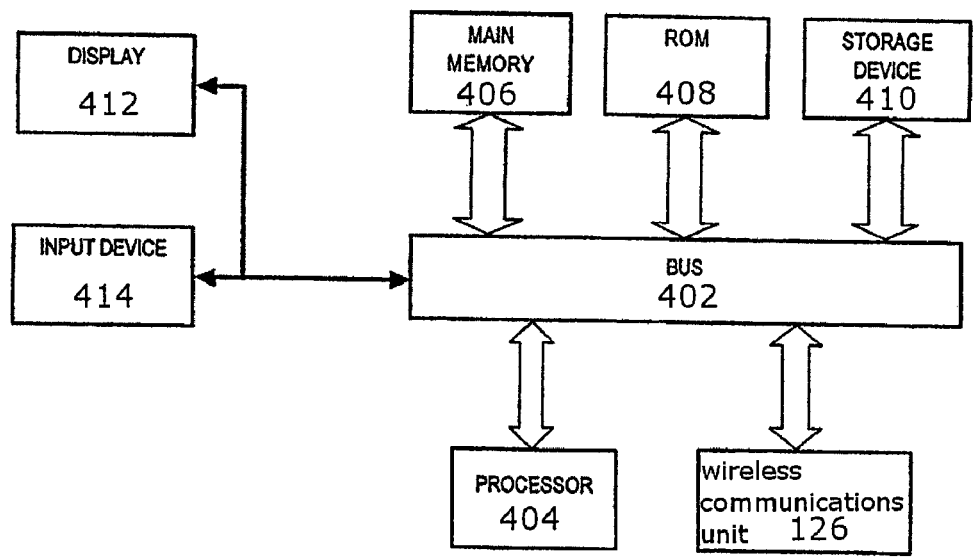
FIG. 4 shows a block diagram of an exemplary data processing system upon which a host console may be implemented.

FIG. 4 shows a block diagram of an exemplary data processing system 400 upon which a host console 20 may be implemented. The data processing system 400 includes a bus 402 or other communication mechanism for communicating information, and a data processor 404 coupled with bus 402 for processing data. The data processing system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by data processor 404. Data processing system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. The data processing system 400 and/or any of the sensors and/or terminals may also have suitable software and/or hardware for converting data from one format to another. An example of this conversion operation is converting format of data available on the system 4 to another format, such as a format for facilitating transmission of the data.

The data processing system 400 may be coupled via bus 402 to a display 412, such as a cathode ray tube (CRT) or liquid crystal display (LCD), for displaying information to an operator. An input device 414, including alphanumeric and other keys, is coupled to bus 402 for communicating information and command selections to processor 404. Another type of user input device is cursor control (not shown), such as a mouse, a touch pad, a trackball, or cursor direction keys and the like for communicating direction information and command selections to processor 404 and for controlling cursor movement on display 412.

The data processing system 400 is controlled in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hardwired circuitry may be used in place of or in combination with software instructions to implement the host console 20. Thus, host console 20 is not limited to any specific combination of hardware circuitry and software. Those skilled in the art will recognize that the host console 20 may run other programs and/or host a wide range of software applications.

The term "machine readable medium" as used herein refers to any medium that participates in providing instructions to processor 404 for execution or providing data to the processor 404 for processing. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402 or an external network. Transmission media can also take the form of electromagnetic or light waves, such as those generated during radio wave and infrared data communications, which may be carried on the links of the bus or network.

Common forms of machine readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a data processing system can read.

Various forms of machine-readable media may be involved in carrying one or more sequences of one or more instructions to processor 404 for execution. For example, the instructions may initially be carried on a magnetic disk of a remote data processing system, such as a server. The remote data processing system can load the instructions into its dynamic memory and send the instructions over a telephone line using a modem. A modem local to data processing system 400 can receive the data on the telephone line and use an infrared transmitter to convert the data to an infrared signal. An infrared detector can receive the data carried in the infrared signal and appropriate circuitry can place the data on bus 402. Of course, a variety of broadband communication techniques/equipment may be used. Bus 402 carries the data to main memory 406, from which processor 404 retrieves and executes instructions and/or processes data. The instructions and/or data received by main memory 406 may optionally be stored on storage device 410 either before or after execution or other handling by the processor 404.

Wireless communications unit 126 is coupled to bus 402 via input/output ports and/or expansion slots, such as USB port, PS/2 port, serial port, parallel port, IEEE-1394 port, infra red communication port, etc., and/or other proprietary ports. Wireless communications unit 126 provides two-way data communications between host console 20 and other wireless alignment sensors 12, 14, 16 and 18, and/or other host consoles. Data received by wireless communications unit 26 is accessible by processor 404 for further processing.

Communications Between Host Console and Alignment Sensors

In the exemplary wireless alignment system 100, each alignment sensor 12, 14, 16, 18 has a unique address. In one embodiment, the address is preset during manufacture of the alignment sensor, assigned by a host sensor 20, or assigned by a user using the user interface 44. The address is stored in the memory 40 and/or 42 of each alignment sensor.

Figure 5:
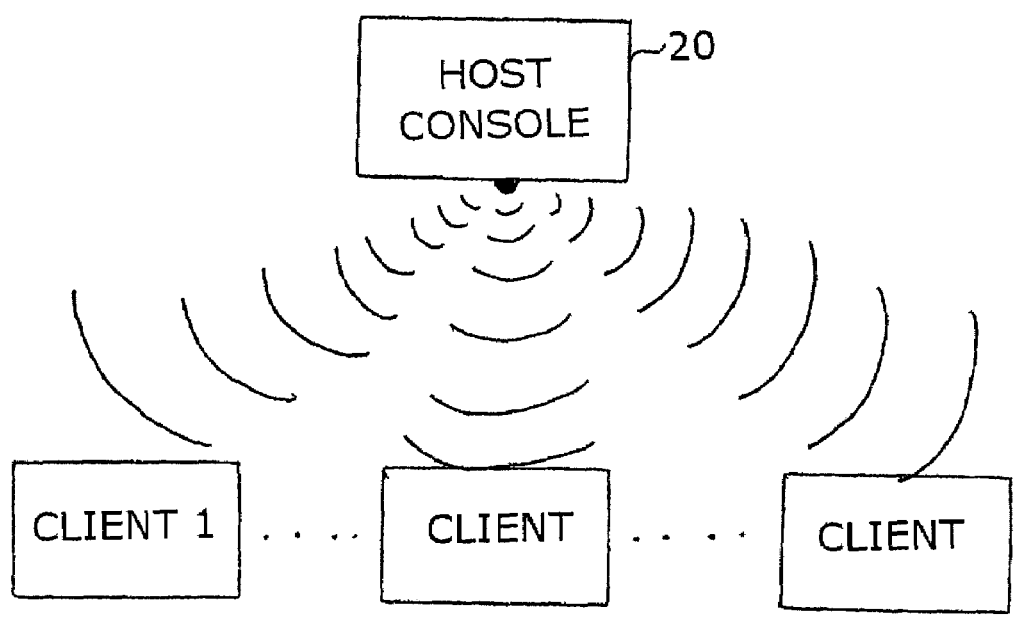
FIG. 5 illustrates a host console broadcasting a request for identifications to a plurality of client devices.

In order to communicate with each alignment sensor properly, the host console 20 conducts an enumeration process to obtain the respective addresses of the alignment sensors 12, 14, 16, 18. As shown in FIG. 5, host console 20 broadcasts a request for identifications of the alignment sensors (each alignment sensor is considered as a client of host console 20). In response to the identification request sent by host console 20, the controller 38 in each alignment sensor accesses the address unique to that alignment sensor from the memory 40 and/or 42, and causes the address be transmitted by the transceiver 28 to host console 20.

According to another embodiment, the address for each sensor is generated by each sensor by combining a preset unique ID with additional data stored in the memory 40 and/or 42 describing the sensor, such as the type of sensor (alignment sensor, battery sensor, emission sensor, etc), the function of the sensor (obtaining voltages, obtaining angles, obtaining data from on-board vehicle computers, etc.), the location of the sensor (right front wheel, headlight, brakes, engine, etc.), a vehicle part to which the sensor is associated (batteries, alternator, tailpipe, wheels, etc.), and/or a service system to which the sensor belongs (wheel alignment systems, body alignment systems, battery service systems, emission test systems, engine analysis systems, etc.), etc. As a result, an address identifying each sensor includes information related to that sensor. According to still another embodiment, a sensor generates an address by directly encoding the additional information related to the sensor without using a preset ID.

The additional information describing a sensor may be pre-stored during manufacture of the sensors, input by a user, and/or determined automatically by the sensor itself. For example, some alignment sensors have intelligence to automatically determine which wheel (right or left front wheel, right or left rear wheel) of a vehicle the alignment sensor is attached to. After the determination is made, the determination result is stored in the memory 42 or non-volatile memory 40. The information also may be entered by a user using user interface 44. For instance, for a wheel alignment system, a user may identify the wheel to which a sensor is associated by pushing LF, RF, LR, RR buttons on the alignment sensor, which represent left front wheel, right front wheel, left rear wheel, right rear wheel, respectively. If the sensor has voice recognition capability, a user may simply identify the wheel vocally, and the sensor would recognize the identity of the wheel based on the user's voice. For other wireless sensors and/or devices that also communicate with host console 20, but perform functions other than wheel alignment, a user may input information identifying those sensors, such as battery sensor, emission sensors, alternator sensors, etc.

The information describing a sensor may include an identification of a system to which a sensor belongs, such that host console 20 may properly identify sources of signals when conducting calculations and/or processing the signals. For instance, in an automotive service center, there may be a plurality of alignment systems in different work bays, and alignment sensors in each alignment system are within communication distances of other alignment systems. Thus, the information describing each alignment sensor may include identity of an alignment system to which the alignment belongs, such as Bay 1, Bay 2, etc. Such additional information is useful when only one host console is serving a plurality of alignment systems. In that case, the host console needs to know which signals to use to calculate alignment parameters for a specific vehicle.

According to another embodiment, information related to a sensor or device is not part of an address for identifying that sensor or device. Rather, each sensor or device sends additional information related to that sensor or device only during the enumeration process, by associating the information with a preset or user-entered unique address of that sensor or device.

After sending the request for identification, host console 20 receives response signals including a unique address and information describing the sensor sending the signals from each alignment sensor. Host console 20 decodes the response signals to obtain the address and, if any, additional information related to each sensor. Host console 20 then associates the additional information related to each sensor with their respective addresses, and stores the addresses and associated information in the memory of host console 20. FIG. 6 shows exemplary data structures used by host console 20 when storing address information related to the sensors. As shown in FIG. 6, a look-up table is created. Data field 61 stores address for each sensor. Data fields 63, 65, 68 store additional information decoded from the response signals received from each sensor, such as identifications of wheels to which sensors are associated (data field 63), systems to which the sensors belong (data field 65), etc.

Now host console 20 possesses a list of addresses for all sensors and their associated information that are within communication distance with host console 20. Host console 20 now is able to discriminate each sensor from others. Whenever signals are received by host console 20, host console 20 decodes the address embedded in the signals, and identifies the sensor sending the signals based on the decoded address by accessing the address information as shown in FIG. 6. In addition, host console 20 also can access, if any, additional information associated with the sensor sending the signals based on the decoded address by accessing the address information as shown in FIG. 6. With the assistance of the address identifying each sensor and additional information related to the sensor, host console 20 can process signals received from each sensor properly.

For example, during the enumeration process, a sensor may identify itself to host console 20 with a unique address, and send additional information indicating the sensor as an alignment sensor associated with an alignment system in Bay 3, and is used for measuring parameters of the right front wheel of a vehicle under alignment service. During the alignment process, signals transmitted by that alignment sensor include the address identifying that alignment sensor, and angle measurement information related to the right front wheel obtained by angle measuring device 54 of that alignment sensor. Host console 20 determines the source of the received signals by decoding the address from the received signals, and accesses information describing the sensor sending the signals based on the address and the table shown in FIG. 6. In this example, the information describes the sensor sending the signals as "an alignment sensor associated with an alignment system in Bay 3, and is used for measuring parameters of the right front wheel of a vehicle." Based on the information describing the sensor, host console 20 processes the angle measurement information related to the right front wheel of a vehicle services by the alignment system in Bay 3, which is included in the signals sent by the alignment sensor, and determines an alignment status of the right front wheel of the vehicle. As host console 20 is able to identify which alignment sensors sent the signals, and which alignment system each sensor associates to, host console 20 can use only information relevant to the same alignment system to calculate an alignment status for a vehicle serviced by that alignment system.

As discusses earlier, additional information related to each sensor may be encoded in the address of the sensor. For sensors or devices using this addressing method, host console 20 may obtain the information related to each device or sensor by directly decoding the address, without the need to create or access a table as shown in FIG. 6.

After the enumeration process, if host console 20 needs to communicate with a specific sensor or device, host console 20 sends a signal in the following format:

"Start Communication Indicator"+"Sensor/device Address"+"Command/information"

The "Start Communication Indicator" indicates that host console 20 is requesting to start communications with, or sending signals to, one of the sensors/devices within its communications distance. In response to the "Start Communication Indicator," controller 38 of each sensor and/or device within communication distance of host console 20 decodes the "Sensor/device Address" to determine whether the decoded address corresponds to the sensor/device by, for example, comparing the decoded address with an address of the sensor/device stored in memory 40 and/or 42. If controller 38 determines that the sensor/device corresponds to the designated address, controller 38 decodes and processes the "command/information" sent by host console 20. On the other hand, if controller 38 determines that the sensor/device does not correspond to the designated address, controller 38 will ignore the "command/information" as well as other signals sent by host console 20, until another "Start Communication Indicator" is generated by the host console 20.

Figure 7:
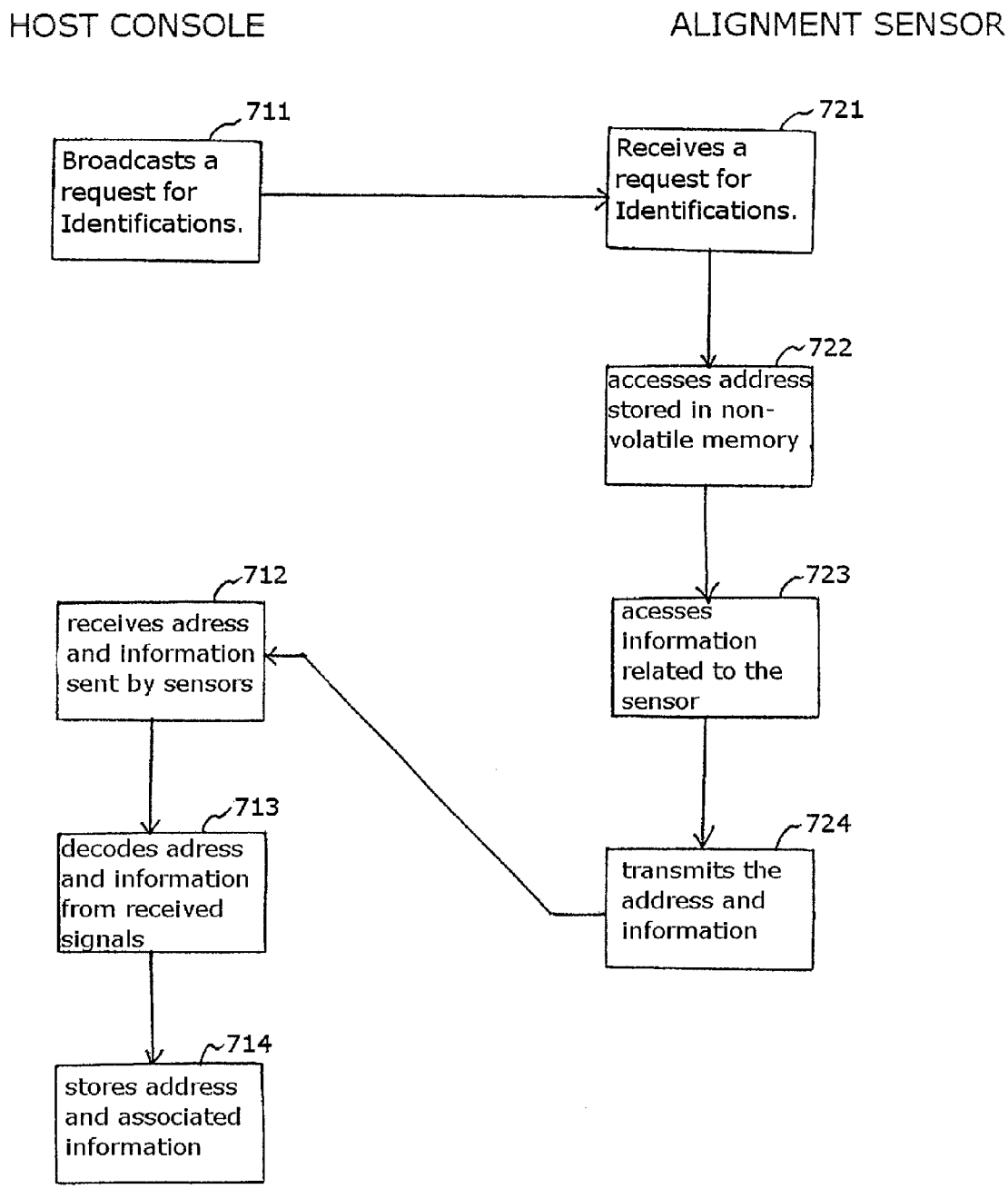
FIG. 7 shows a flow chart for an enumeration process.
Figure 8:
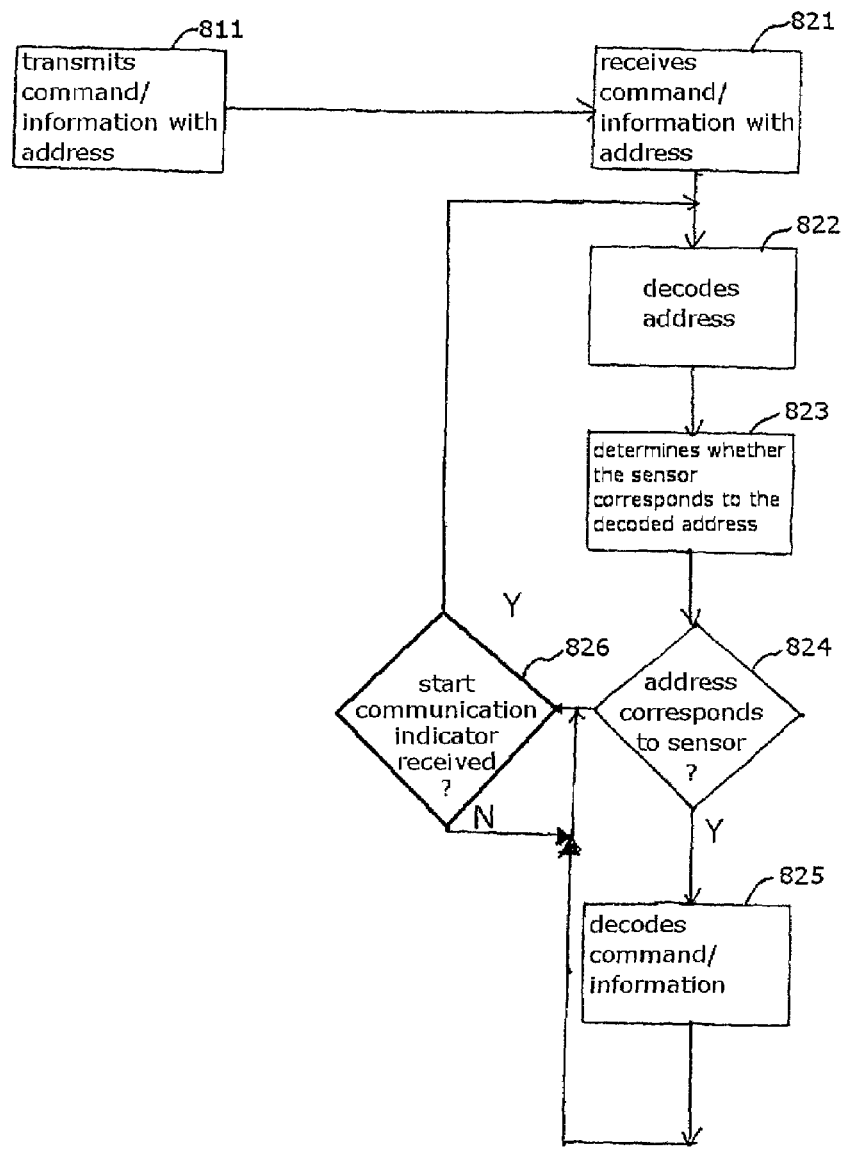
FIG. 8 shows a process for a host console to send command/information to a specific alignment sensor designated by an address.
Figure 9:
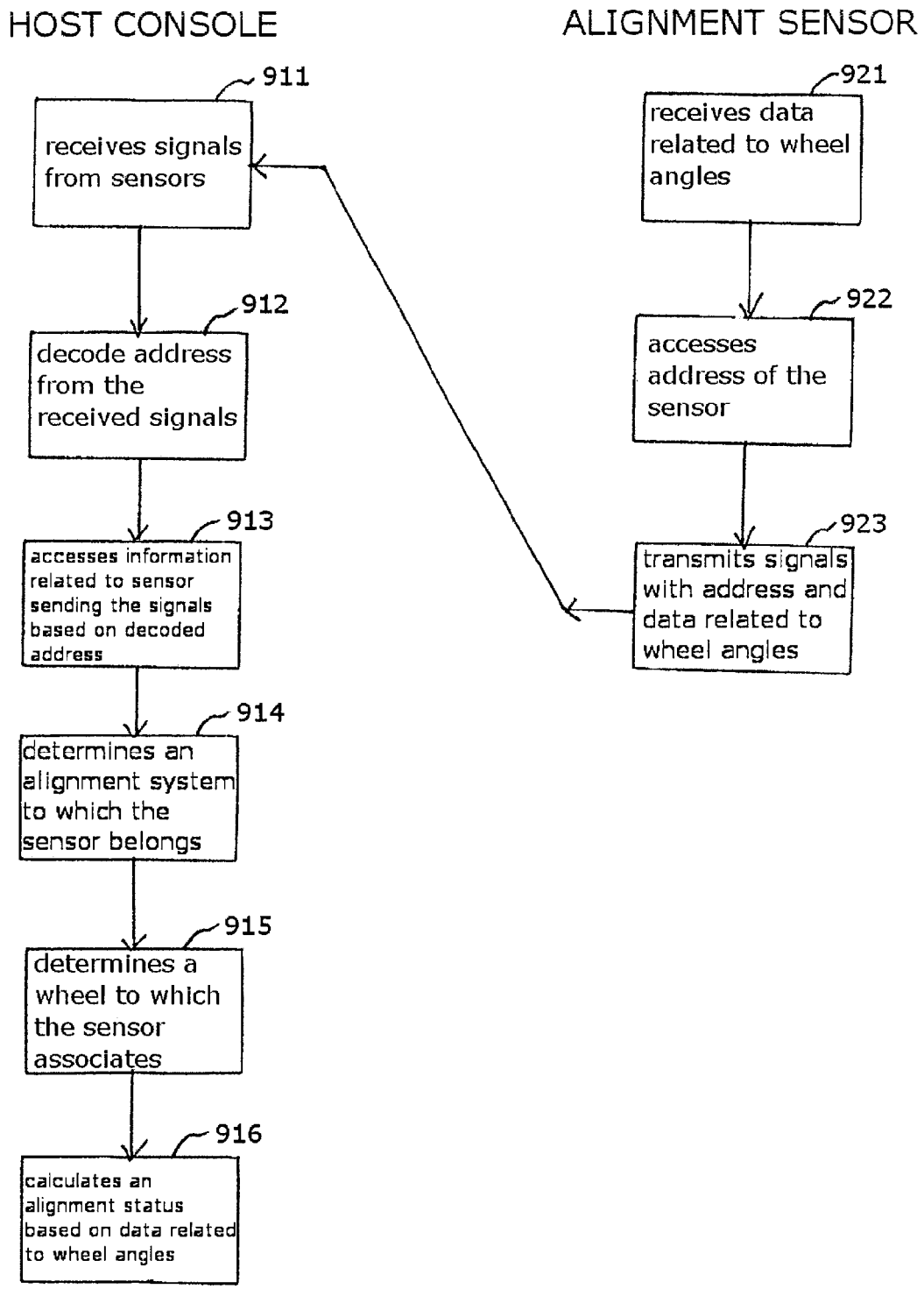
FIG. 9 illustrates a process when an alignment sensor initiates communications with host console.

FIGS. 7-9 are flow charts illustrating communications between host console 20 and sensors/devices as described above. FIG. 7 shows an enumeration process. In step 711, host console 20 broadcasts a request for identifications of sensors within its communications distance. The alignment sensor, after receives the request for identifications (Step 721), accesses address stored in memory 40 and/or 42 that uniquely identifies the sensor, and information related to that sensor (Steps 722 and 723). In Step 724, the alignment sensor transmits signals including the address and associated information of the sensor. In Step 712, host console 20 receives the signals transmitted by the alignment sensor. Host console 20 then decodes address and information associated to the alignment sensor from the received signals (Step 713), and stores the decoded address and the associated information in the memory of the host console (Step 714).

FIG. 8 shows a process for host console 20 to send command/information to a specific alignment sensor designated by an address. In Step 811, host console 20 transmits command/information with an embedded address designating a specific sensor and a Start-Communication-Indicator. After receiving the command/information, each sensor decodes the address embedded in the signals (Steps 821 and 822), and determines whether the decoded address corresponds to the address of the sensor (Step 823). If the decoded address corresponds to the sensor, the alignment sensor decodes the command/information included in the signals (Steps 824 and 825). The alignment sensor may perform certain functions and/or process data based on the received command/information. Otherwise, the alignment sensor will ignore the signals and continuously check whether new signals including a Start-Communication-Indicator has arrived (Step 826). If new signals with a Start-Communication-Indicator have arrived, the alignment sensor repeats Step 822; otherwise, the alignment sensor will repeat Step 826 to check whether new signals with a Start-Communication-Indicator have arrived.

FIG. 9 illustrates a process when the alignment sensor initiates communications with host console 20. The alignment sensor receives data related to wheel angles from its angle determining device 54 (Step 921). The alignment sensor accesses memory 40 and/or 42 for address of the sensor, and generates and transmits signals including the address and data related to wheel angles (Steps 922 and 923). Host console 20, after receiving the signals transmitted by the alignment sensor (Step 911), decodes address from the received signals (Step 912). In Step 913, host console 20 accesses information related to the sensor sending the received signals, such as an alignment system to which the sensor belongs and/or a wheel to which the sensor is associated, based on the decoded address. After host console 20 determines the alignment system to which the sensor belongs and/or a wheel to which the sensor is associated (Steps 914 and 915), host console calculates an alignment statue based on the data related to wheel angles (Step 916). The result of calculation may be displayed on a display of host console 20.

Additional variations to the wireless vehicle service system are available. For example, during operation, host console 20 may conduct the enumeration process periodically or repeatedly to gather updated addresses and/or related information of sensors and/or devices within its communications distance.

According to another variation, each sensor or device may send a notification signal including address and/or associated information to host console 20 whenever its address and/or associated information are updated. For instance, an alignment sensor may be used for measuring parameters of the right front wheel during an alignment service of a first vehicle, and identifies itself as such during the enumeration process. However, after the service is concluded, the same alignment sensor may be used for measuring parameters of the left rear wheel in a new alignment service of another vehicle. In this case, the information related to sensor is updated, either by user input or automatic determination as previous described, and stored in non-volatile memory 40 or memory 42 of that alignment sensor. In response to the update of the information, controller 38 accesses the updated information, and generates a new address for that sensor or device based on the updated information. Controller 38 then causes the updated address be transmitted to host console 20 by transceiver 28. Alternatively, controller 38 may continue to use the preset unique ID associated with that sensor or device, but sends a notification signal to host console 20 to request host console 20 to update information related to the address associated with that sensor or device accordingly.

For a wireless system using devices with addresses encoding information describing the devices, an enumeration process may be omitted. As the address of each device includes embedded information describing that device, host console 20 obtains information related to devices every time a signal containing an address arrives. Therefore, an enumeration for obtaining information related to devices within communication distances is not needed.

The application of addressable devices is not limited to wheel alignment systems. Other systems that involve communications with a plurality of devices may use the approaches as described in this disclosure to conduct communications between host and devices. These approaches may be applied to a system using different types of devices or sensors. For example, in a vehicle service system, a single host may communicate with various types of sensors used on a vehicle concurrently, such as alignment sensors for conducting alignment service, battery sensors for battery service, emission sensors for conducting emission test, etc. Each sensor includes a wireless communications unit 122 as described earlier for communicating with the host. By using the above addressing approaches, additional information related to the sensor, such types of the sensors, is available to the host. Thus, a single host can properly discriminate and process signals from different types of sensors. For example, the host can process signals from a battery sensor by using algorithms for determining a battery status, and process signals from an emission sensor by applying algorithms related to emission tests.

It is intended that all matter contained in the above description and shown in the accompanying drawings shall be interpreted as illustrative and not in a limiting sense. It is also to be understood that the following claims are intended to cover all generic and specific features herein described and all statements of the scope of the various inventive concepts which, as a matter of language, might be said to fall there-between.

What is claimed is:

1. A method for communicating with a plurality devices for collecting information related to a vehicle, the method comprising the steps of:

broadcasting a request to solicit identifications of the devices;

receiving signals sent by each of the plurality of devices in response to the request, wherein the signals include an address identifying the device sending the signals and information describing the device sending the signals;

decoding the information describing the device sending the signals; and processing the signals based on the information describing the device sending the signals; wherein:

the devices include a measurement sensor for determining positional parameters of vehicle wheels;

and an address associated with the measurement sensor is created by:

receiving information input by a user identifying a wheel to which the measurement sensor is associated;

accessing the information identifying the wheel to which the measurement sensor is associated; and creating the address identifying the sensor by incorporating the information identifying the wheel to which the measurement sensor is associated into the address.

2. The method of claim 1, further comprising the step of transmitting signals embedding the address unique to the measurement sensor in response to a request soliciting identification of the measurement sensor.

3. The method of claim 1, further comprising the steps of:

accessing information identifying an alignment system to which the measurement sensor is associated; and incorporating the information identifying the alignment system to which the measurement sensor is associated into the address.

4. The method of claim 3, wherein the information identifying the alignment system to which the measurement sensor is associated is input by a user.

5. The method of claim 1, further comprising the step of incorporating information identifying the manufacturer of the measurement sensor into the address.

6. The method of claim 1, wherein the step of creating the address includes the steps of:

accessing a preset ID of the measurement device; and generating the address by combining the preset ID with the information identifying the wheel to which the measurement sensor is associated.

7. A method for communicating with a plurality devices for collecting information related to a vehicle, the method comprising the steps of:

broadcasting a request to solicit identifications of the devices;

receiving signals sent by each of the plurality of devices in response to the request, wherein the signals include an address identifying the device sending the signals and information describing the device sending the signals;

decoding the information describing the device sending the signals; and processing the signals based on the information describing the device sending the signals, wherein the address includes information identifying an alignment system to which the device sending the address is associated.

8. The method of claim 7, further comprising the step of decoding the information identifying the alignment system to which the device sending the address is associated.

9. The method of claim 8 further comprising the step of associating the address with the information identifying the alignment system to which the device sending the address is associated.

10. The method of claim 9 further comprising the steps of:

decoding the address from the signals received from the device;

accessing information that identifies a wheel to which the device sending the decoded address is associated based on the decoded address;

accessing information that identifies an alignment system to which the device sending the decoded address is associated based on the decoded address; and calculating positional parameters of the wheel to which the device sending the decoded address is associated based on the received signals.

11. A method for communicating with a plurality devices for collecting information related to a vehicle, the method comprising the steps of:

broadcasting a request to solicit identifications of the devices;

receiving signals sent by each of the plurality of devices in response to the request, wherein the signals include an address identifying the device sending the signals and information describing the device sending the signals;

decoding the information describing the device sending the signals; and processing the signals based on the information describing the device sending the signals, the method further comprising steps of:

decoding the address from the signals received from the device;

accessing information that identifies a wheel to which the device sending the decoded address is associated based on the decoded address; and calculating positional parameters of the wheel to which the device sending the decoded address is associated based on the received signals.

12. A method for communicating with a plurality devices for collecting information related to a vehicle, the method comprising the steps of:

broadcasting a request to solicit identifications of the devices;

receiving signals sent by each of the plurality of devices in response to the request, wherein the signals include an address identifying the device sending the signals and information describing the device sending the signals;

decoding the information describing the device sending the signals;

processing the signals based on the information describing the device sending the signals; and creating an address associated with the device for obtaining parameters for various parts of a vehicle, wherein creating an address comprises the steps of:

receiving information input by a user identifying a part of the vehicle to which the device is associated;

accessing the information identifying the part of the vehicle to which the device is associated; and creating an address unique to the device by incorporating the information identifying the part of the vehicle to which the device is associated into the address.

13. The method of claim 12, further comprising the step of transmitting signals embedding the address unique to the device in response to a request soliciting identification of the device.

14. The method of claim 12, further comprising the steps of:

accessing information identifying a vehicle service system to which the device is associated; and incorporating the information identifying the vehicle service system to which the device is associated into the address.

15. The method of claim 14, wherein the information identifying the vehicle service system to which the device is associated is input by a user.

* * * * *